United States Patent
Alexander et al.

(10) Patent No.: US 8,015,362 B2
(45) Date of Patent: Sep. 6, 2011

(54) METHOD AND SYSTEM FOR HANDLING CACHE COHERENCY FOR SELF-MODIFYING CODE

(75) Inventors: Gregory W. Alexander, Pflugerville, TX (US); Christian Jacobi, Schoenaich (DE); Barry W. Krumm, Poughkeepsie, NY (US); Chung-Lung Kevin Shum, Wappingers Falls, NY (US); Aaron Tsai, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 12/031,923

(22) Filed: Feb. 15, 2008

(65) Prior Publication Data
US 2009/0210627 A1 Aug. 20, 2009

(51) Int. Cl.
*G06F 12/00* (2006.01)
(52) U.S. Cl. ........ 711/141; 711/119; 711/123; 711/124; 711/125; 711/126
(58) Field of Classification Search .................. None
See application file for complete search history.

(56) References Cited

U.S. PATENT DOCUMENTS
6,732,237 B1 * 5/2004 Jacobs et al. .................. 711/119
6,865,645 B1 * 3/2005 Shum et al. .................. 711/123

OTHER PUBLICATIONS
z/Architecture, Principles of Operation, Sixth Edition, Apr. 2007, Publication No. SA22-7832-05, copyright IBM Corp. 1990-2007, pp. 1-1218.

* cited by examiner

*Primary Examiner* — Kevin L Ellis
*Assistant Examiner* — Alan Otto
(74) *Attorney, Agent, or Firm* — Cantor Colburn LLP; John Campbell

(57) ABSTRACT

A method for handling cache coherency includes allocating a tag when a cache line is not exclusive in a data cache for a store operation, and sending the tag and an exclusive fetch for the line to coherency logic. An invalidation request is sent within a minimum amount of time to an I-cache, preferably only if it has fetched to the line and has not been invalidated since, which request includes an address to be invalidated, the tag, and an indicator specifying the line is for a PSC operation. The method further includes comparing the request address against stored addresses of prefetched instructions, and in response to a match, sending a match indicator and the tag to an LSU, within a maximum amount of time. The match indicator is timed, relative to exclusive data return, such that the LSU can discard prefetched instructions following execution of the store operation that stores to a line subject to an exclusive data return, and for which the match is indicated.

10 Claims, 5 Drawing Sheets

METHOD AND SYSTEM FOR HANDLING CACHE COHERENCY FOR SELF-MODIFYING CODE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

This invention relates to computer microprocessor design and, more particularly, to the handling of cache coherency for self-modifying code.

In an instruction set architecture that supports self-modifying code, such as that utilized by IBM® System/Z, the processor needs to ensure that, after each instruction which modifies instruction storage, subsequent instructions will be based on the updated storage. This can be achieved by discarding prefetched instructions and refetching updated instruction data.

Self-modifying code presents a special problem to modern microprocessors that utilize separate instruction and data caches. In this design, the data cache lacks the necessary information to determine whether or not data modified affects instruction storage, and thus whether prefetched instructions need to be discarded. Special interlocks between the data cache and the instruction cache should be designed to detect whether prefetched instructions should be discarded due to modified store results.

In the existing art, the interlocks to detect stores into a processor's instruction stream are known, collectively, as program-store-compare (PSC.)

The instruction cache maintains a table of addresses that have been prefetched but not completed. When the load-store unit (LSU), which contains the data cache, performs a store, the address of that store is sent to the instruction cache along a special PSC bus. If that instruction is found in the table of addresses currently prefetched, the instruction cache will send a PSC found indication to the LSU, indicating that prefetched instructions must be discarded following the store that caused the check.

The special PSC bus is often a difficult timing path, and it utilizes significant amounts of chip wiring resources. In addition, normal cache invalidate handling may have to be postponed in order to handle PSC checks of the instruction address table, which can harm system performance.

SUMMARY OF THE INVENTION

Exemplary embodiments of the invention provide a method and system for handling cache coherency for self-modifying code. The method includes allocating a program store compare (PSC) tag by a load store unit (LSU) in response to determining a cache line is not exclusive in a data cache for a store operation. The method also includes sending the PSC tag and an exclusive fetch for the cache line to coherency logic. The method further includes sending an invalidation request to the instruction cache that includes an address to be invalidated, the PSC tag, and an indicator specifying the request is for a PSC operation. The method further includes comparing the requested address with an address table that stores addresses of pending instructions fetched by a processor, the instruction cache bypassing an invalidation state machine. In response to a match resulting from the comparison, the method includes sending an indicator of the match and the PSC tag to the LSU, the indicator of the match sent within a fixed maximum amount of time after the cache invalidation request. The fixed minimum amount of time from the cache invalidate request to the instruction cache, and the fixed maximum amount of time from the cache invalidation request to the LSU are accounted for, such that the LSU can discard instructions received following the execution of the store operation that stores to a cache line subject to an exclusive data return, and for which the match is indicated.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

An improved program-store-compare (PSC) design is provided in accordance with exemplary embodiments. The design provides a special PSC tag that is sent from coherency handling logic to an instruction cache along with a cache invalidation request that may be a part of normal coherency handling when a load store unit (LSU) performs an exclusive fetch for a cache line to be stored. This invalidation request is sent within a minimum amount of time before the data associated with the request is allowed to be returned to the LSU. The instruction cache performs a fast-path check against an instruction address table and sends a PSC 'found' or 'hit' indication, along with the PSC tag, within a fixed maximum amount of time, early enough for the LSU to know that prefetched instructions are to be discarded after the exclusively fetched cache line is stored.

Figure 1:
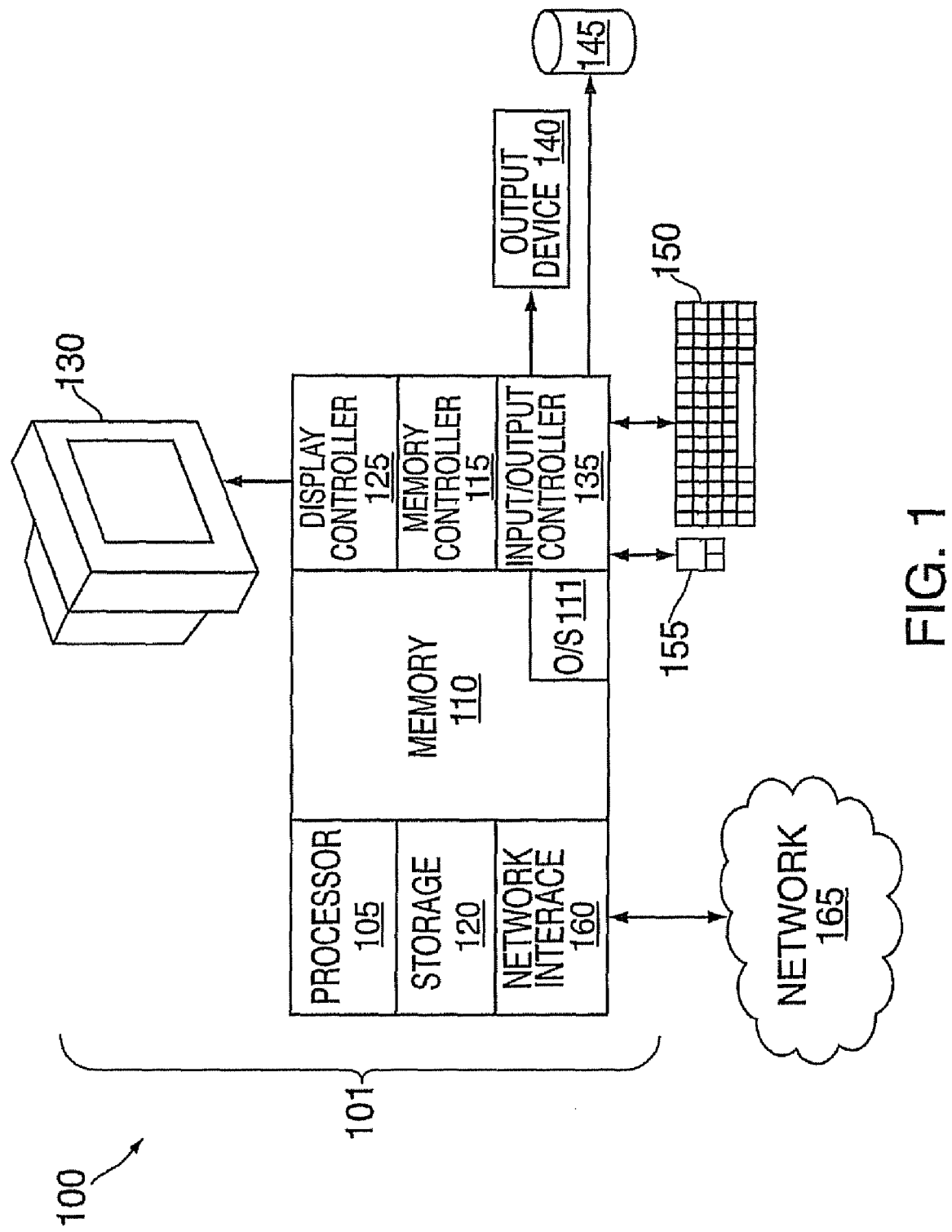
FIG. 1 is a block diagram of a system upon which program store compare processes may be implemented in accordance with an exemplary embodiment.

Turning now to FIG. 1, a system 100 upon which the program store compare (PSC) processes may be implemented in accordance with an exemplary embodiment will now be described. The processes described herein can be implemented in hardware, software (e.g., firmware), or a combination thereof. In an exemplary embodiment, the processes described herein are implemented in hardware, and is part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes one or more processors 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor may include one more units, e.g., instruction fetch units (IFUs), fixed-point execution units (FXUs), branch resolution units (BRUs), and floating point units (FPUs), among other units.

An instruction can transition through stages of: fetching, dispatching, execution, and retirement. Fetching acquires an instruction from memory, most likely through a local cache, such as an instruction cache. Dispatching controls when the instruction is sent to an execution unit. Execution can be performed in different units depending upon the type of instruction, e.g., fixed point versus floating point. The instruction can complete execution in one cycle or in multiple cycles, again depending upon the instruction type. Upon execution completion, put away (storage) may be performed to update certain registers or memory storage (including the processor's local cache). The instruction is retired at the end of an operation, making any final changes to the state of the processor 105 and performing instruction checkpointing to capture a known good state of the processor 105.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

The PSC processes described herein are part of the processor 105.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a personal computer, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions.

In an exemplary embodiment, where the PSC processes are implemented in hardware, the PSC processes described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
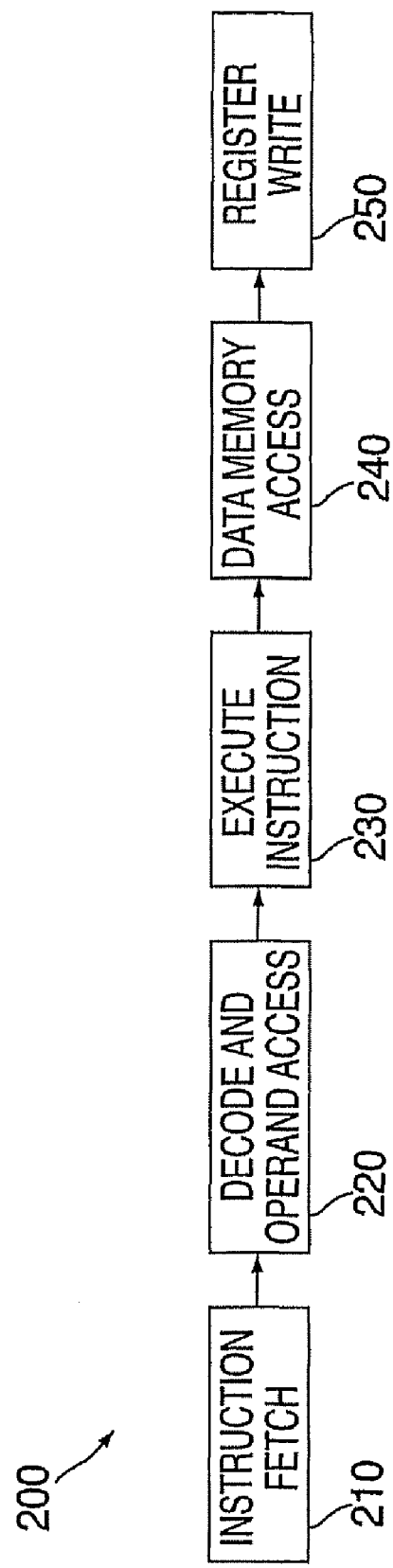
FIG. 2 is a pipeline used in implementing the program store compare processes in accordance with an exemplary embodiment.

FIG. 2 illustrates a block diagram of a processor instruction pipeline system 200 in which the exemplary PSC processes can be implemented in accordance with an exemplary embodiment. As described above, the simplest way to speed up the processor 105 operation is to pipeline it. Pipelining is one specific form of parallelism, where the execution of several instructions can be interleaved on the same hardware. In an exemplary embodiment, the pipeline system includes five stages: (1) Instruction fetch 210; (2) Decode and operand access 220; (3) Execute instruction 230; (4) Data memory access 240; and (5) Register write 250. In an exemplary embodiment, the instruction fetch 210 stage fetches instructions to be processed. The Decode and operand access 220 stage decodes the instruction and gathers the source operands needed by the instruction being processed. The Execute instruction 230 stage performs the function of the instructions that can include arithmetic logic unit (ALU) operations. The Data memory access 240 stage performs any data memory access functions associated with the instruction. The Write Register write 250 stage writes the appropriate result value into the register file. As described above, the pipeline system 200 can be enhanced by the PSC by eliminating a direct PSC indication (e.g., PSC bus) between a data cache and an instruction cache, whereby a higher level cache maintains information about lower level cache inclusivity and uses a variation of an existing cache invalidation process for handling PSC functions. These processes are described further herein.

Figure 3:
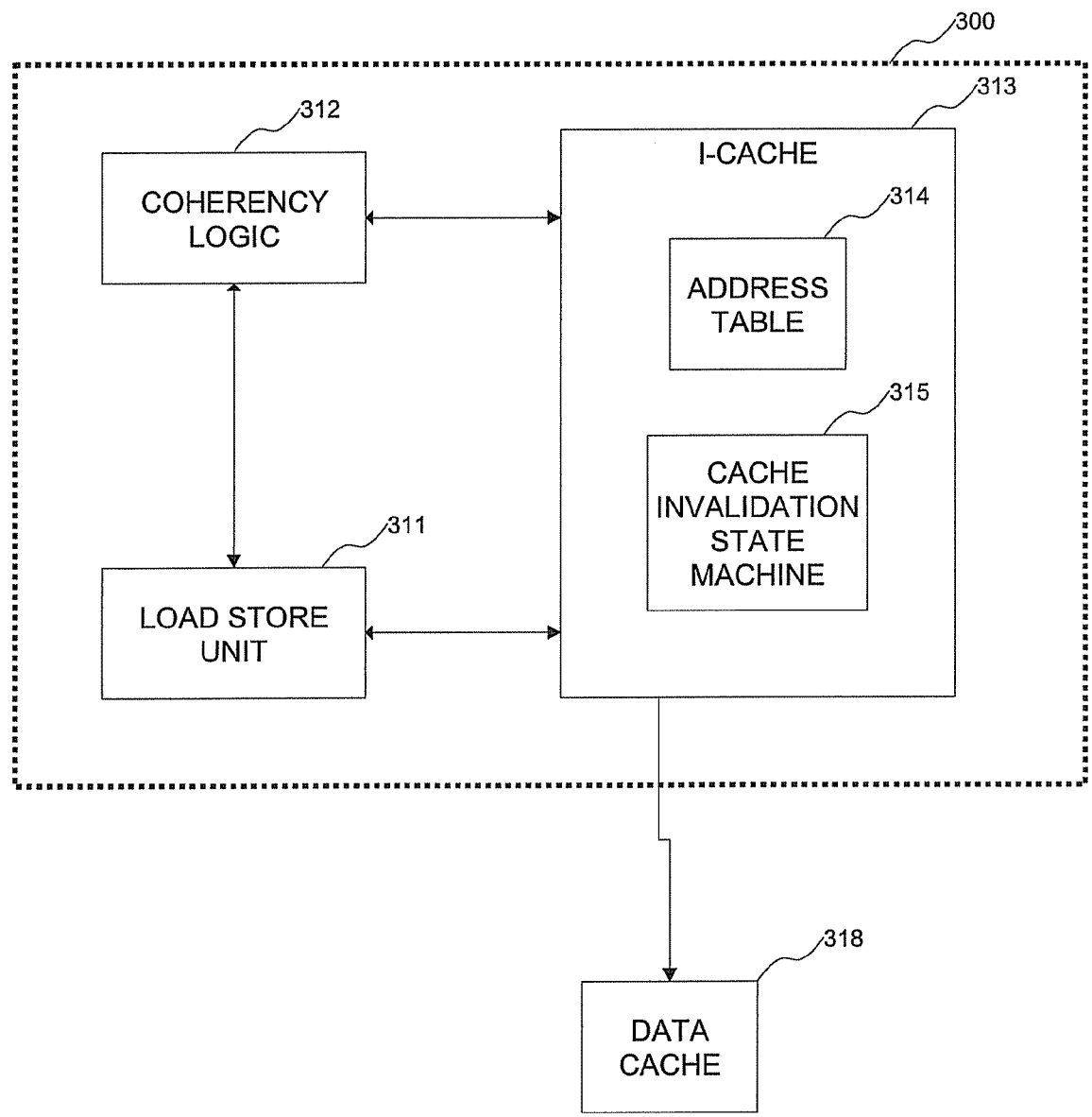
FIG. 3 is a block diagram describing various components used in implementing the program store compare processes in accordance with an exemplary embodiment.
Figure 4A:
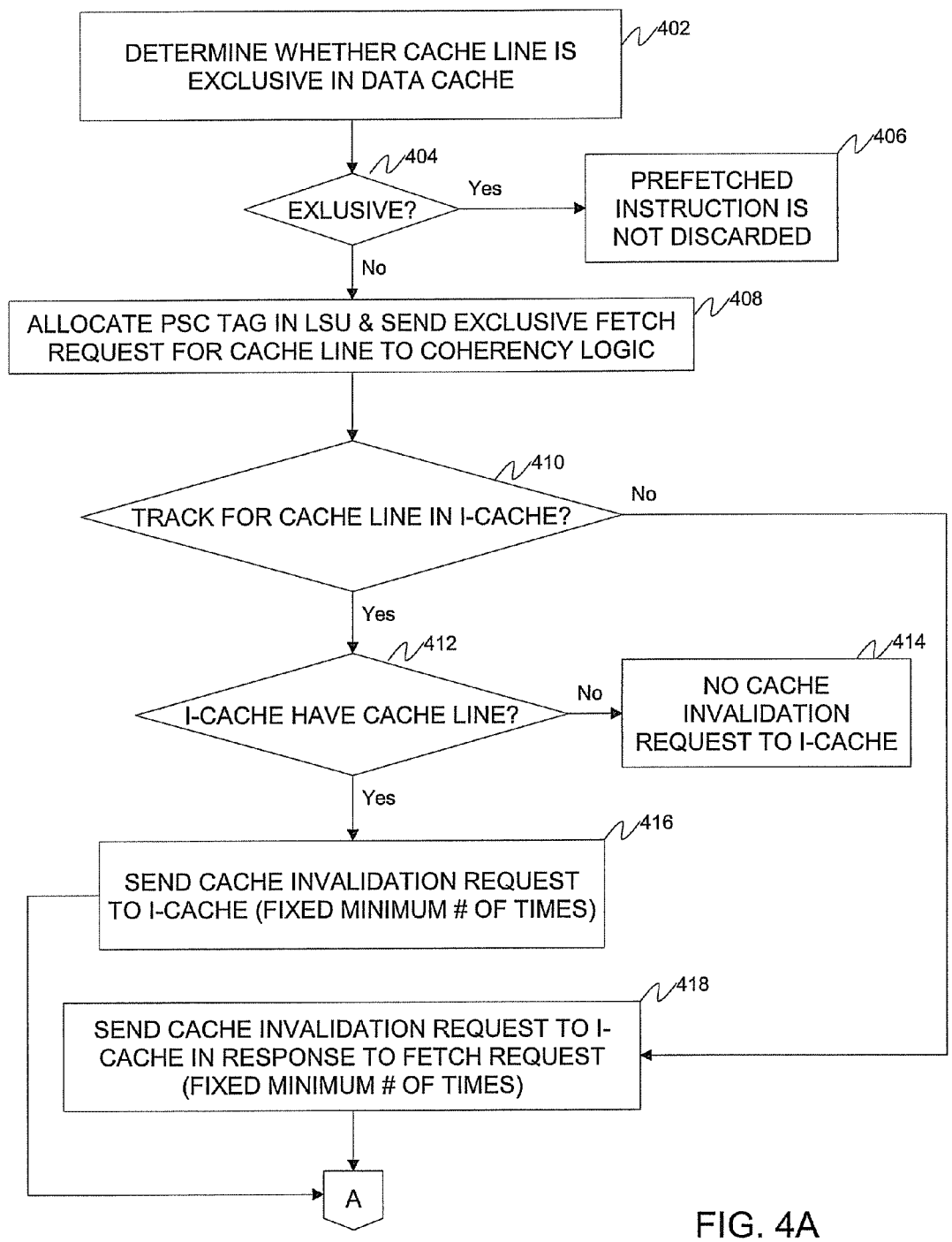
FIGS. 4A and 4B are flow diagrams describing a method for implementing program store compare processes in an exemplary embodiment.
Figure 4B:
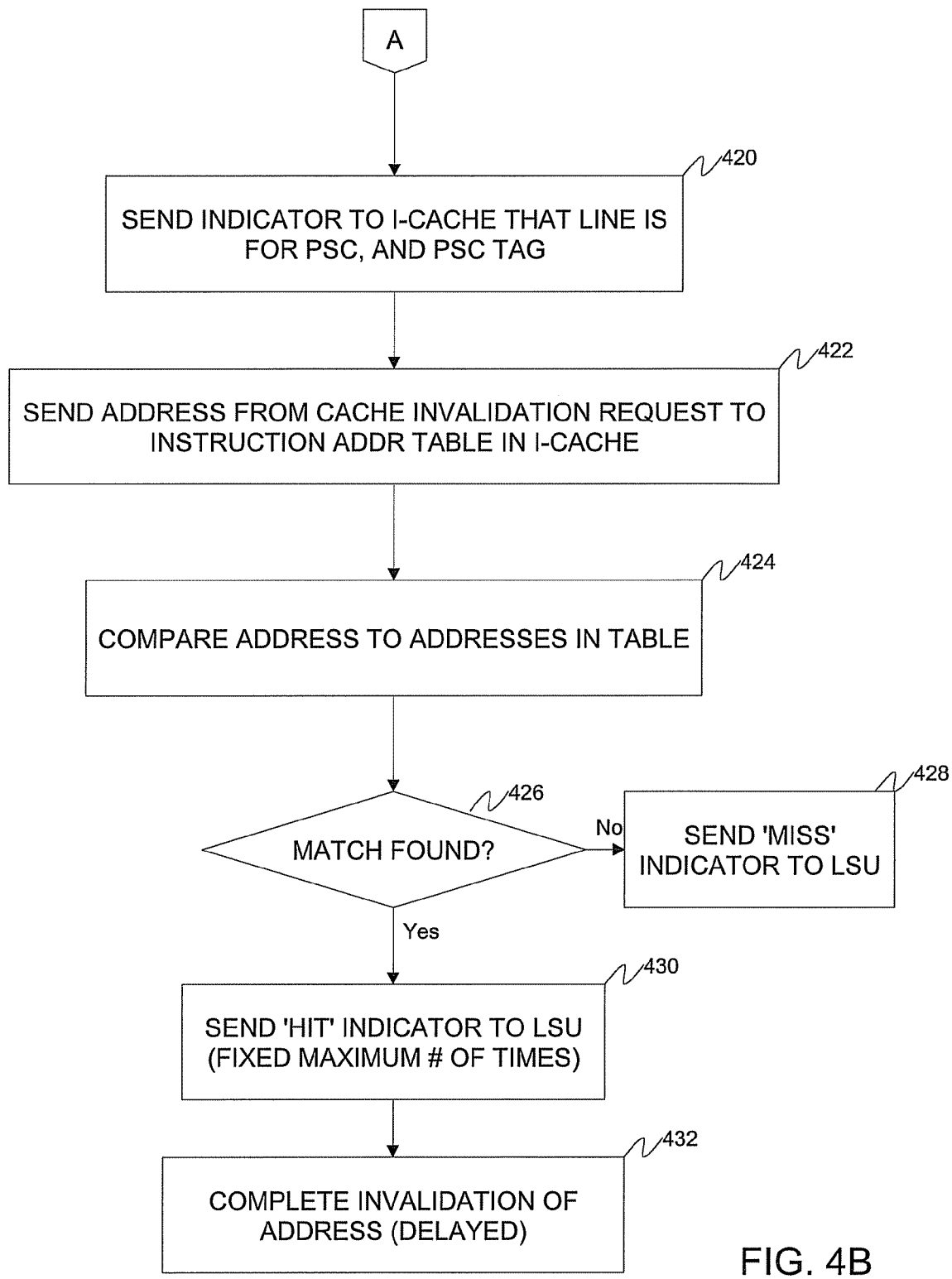

Turning now to FIGS. 3, 4A, and 4B, a block diagram illustrating various components 300 used in implementing the PSC processes, as well as a flow diagram describing these processes, will now be described in an exemplary embodiment. As indicated above, the PSC components 300 may form a portion of the processor 105 described in FIG. 1. The PSC components 300 of FIG. 3 include a load-store unit (LSU) 311, an instruction cache (I-cache) 313, and coherency logic 312. In an exemplary embodiment, the coherency logic 312 may be implemented by a higher level cache, e.g., a level 2 (L2) cache. The LSU 311 is responsible for executing store instructions and operand data loads, the instruction cache 313 handles fetching instructions, and the coherency logic 312 sends cache invalidation requests to the instruction cache 313. The instruction cache 313 maintains an instruction address table 314 containing addresses of instructions that have been fetched by the processor (e.g., processor 105 of FIG. 1). The instruction cache 313 also maintains a cache invalidation state machine 315. These components 300 are in communication with a data cache 318. In one embodiment, the data cache 318 may be incorporated within the LSU 311.

When the LSU 311 processes a store instruction, it checks to see if the store target cache line is already exclusive in the data cache 318 at step 402. If it is at step 404, then prefetched instructions do not need to be discarded at step 406. This is because the cache line cannot be in the instruction cache, and thus cannot be part of any prefetched instructions, as the only cache in which the line is present is the data cache 318.

If, however, the cache line is not exclusive in the data cache 318 at step 404, a tag (also referred to herein as "PSC tag") is allocated in the LSU 311 at step 408. In one embodiment, this PSC tag may include a fetch address register id used to track the exclusive fetch in a higher level cache (e.g., L2 or main memory). The PSC tag is sent to the coherency logic 312 along with the exclusive fetch for the cache line.

The coherency logic 312 tracks whether or not a cache line has been fetched by the instruction cache 313, and has since not been invalidated. If the coherency logic 312 does such tracking, then the coherency logic 312 sends a cache invalidation request to the instruction cache 313 only if the instruction cache 313 is considered to still have the cache line at step 416. In an exemplary embodiment, the cache invalidation request includes the address to be invalidated. Otherwise, if the coherency logic 312 does not do such tracking, then the coherency logic 312 sends a cache invalidation request to the instruction cache 313 in response to the LSU 311 sending the exclusive fetch at step 418.

Along with the cache invalidation request sent to the instruction cache 313, the coherency logic 312 sends an indication that the cache line is for PSC, along with the PSC tag assigned by the LSU 311 at step 420. The coherency logic 312 sends the cache invalidation request within a fixed minimum amount of time before the cache line can be returned exclusively to LSU 311 and be stored to by the data cache 318.

As indicated above, the instruction cache 313 maintains an instruction address table 314 containing addresses of pending instructions that have been fetched or prefetched by the processor. When the instruction cache 313 receives the cache invalidation request, which includes an address to be invalidated, the instruction cache 313 sends the address down a fast path to the instruction address table 314, bypassing the cache invalidation state machine 315 at step 422. The cache invalidation address is also sent to the cache invalidation state machine 315, such that the instruction cache can be invalidated later. Further fetches to the instruction cache using the same cache invalidation address are blocked until the pending cache invalidation actually occurs. Cache invalidation and blocking fetches to an address are well understood in the art.

When the cache invalidate request address reaches the instruction address table 314, its value is compared against all of the addresses fetched by the processor (i.e., the addresses stored in the table 314) at step 424. If the cache invalidate request address matches any of the fetched instruction addresses stored in the table 314 at step 426, a hit is determined and an indicator of the hit, as well as the PSC tag are sent to the LSU 311 at step 430. The indicator is sent to the LSU 311 within a fixed maximum amount of time after the cache invalidation request is received from the coherency logic 312. The minimum amount of time from the cache invalidate request to the exclusive fetch data return use, and the maximum amount of time from the cache invalidation request to the hit indication are accounted for such that any prefetched instructions following a store operation from the same store target line can be discarded. For example, if the minimum number of cycles from cache invalidate to exclusive fetch data return is 8 clock cycles, and prefetched instructions can be discarded following a store using the data return with an hit indication 2 cycles after the exclusive data return, then the maximum number of cycles from cache invalidate to hit indication is 10 cycles. Latch staging and other considerations may apply in order to meet these cycle targets.

Turning back to step 426, if there is no match, a miss is determined at step 428 indicating that the address has not been prefetched, and prefetched instructions do not need to be discarded. The block of further fetches to the same address ensures that the line will not be prefetched from the instruction cache after a miss indication. At step 432, the cache invalidation is completed.

Technical effects of the PSC processes described herein provide a solution which eliminates the dedicated program-store-compare (PSC) bus from the load-store unit (LSU) to the instruction cache. This frees up precious wiring resources, as well as eliminates a potentially tight timing path. The PSC processes also remove the need for a special PSC handling mechanism in the instruction cache that is known to interfere with normal cache invalidation handling.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for handling cache coherency for self-modifying code, comprising:
    allocating a program store compare (PSC) tag by a load store unit (LSU) in response to determining a cache line is not exclusive in a data cache for a store operation;
    sending the PSC tag with an exclusive fetch for the cache line to coherency logic;
    sending a cache invalidation request that includes an address to be invalidated, the PSC tag, and an indicator specifying the request is for a PSC operation;
    receiving at an instruction cache the cache invalidation request and comparing the requested address with an address table that stores addresses of pending instructions fetched by a processor, the instruction cache bypassing a cache invalidation state machine for a duration of the comparison; and
    sending an indicator of a match and the PSC tag, by the instruction cache, to the LSU responsive to a match resulting from the comparison, the indicator of the match sent within a first period of time after the cache invalidation request, the LSU processing the match indication;
    wherein the LSU discards prefetched instructions following execution of the store operation that stores to a cache line, subject to an exclusive data return for which the match is indicated, within a time period no greater than the total of the first period of time from the cache invalidate request to the match indication, and a second period of time from the cache invalidation request to the exclusive data return to the LSU.

2. The method of claim 1, wherein:
    the instruction cache and the data cache form a low level cache; and
    a higher level cache implements the coherency logic, the coherency logic tracking instruction cache activity and sending the cache invalidation request to the instruction cache.

3. The method of claim 2, wherein the coherency logic tracks instruction cache activity for determining when an instruction cache has the cache line.

4. The method of claim 1, wherein the cache invalidate request is sent to the instruction cache only when the cache line fetched exclusive by the LSU has been previously fetched by the instruction cache, and has since not been invalidated.

5. The method of claim 4, wherein a delay is added to the return of data for exclusive fetches when the cache invalidate request is sent to the instruction cache.

6. A system for handling cache coherency for self-modifying code, comprising:
    program store compare (PSC) components for execution by a processor, the PSC components including a load store unit (LSU), an instruction cache, and a coherency logic, the PSC components configured to perform a method, comprising:
    allocating a program store compare (PSC) tag by the LSU in response to determining a cache line is not exclusive in a data cache for a store operation;
    sending the PSC tag with an exclusive fetch for the cache line to the coherency logic;
    sending a cache invalidation request that includes an address to be invalidated, the PSC tag, and an indicator specifying the request is for a PSC operation;
    receiving at the instruction cache the cache invalidation request and comparing the requested address with an address table that stores addresses of pending instructions fetched by a processor, the instruction cache bypassing a cache invalidation state machine for a duration of the comparison; and
    sending an indicator of a match and the PSC tag, by the instruction cache, to the LSU, responsive to a match resulting from the comparison the indicator of the match sent within a first period of time after the cache invalidation request, the LSU processing the match indication;
    wherein the LSU discards prefetched instructions following execution of the store operation that stores to a cache line, subject to an exclusive data return for which the match is indicated, within a time period no greater than the total of the first period of time from the cache invalidate request to the match indication, and a second period of time from the cache invalidation request to an exclusive data return to the LSU.

7. The system of claim 6, wherein:
    the instruction cache and the data cache form a low level cache; and
    a higher level cache implements the coherency logic, the coherency logic tracking instruction cache activity and sending the cache invalidation request to the instruction cache.

8. The system of claim 7, wherein the coherency logic tracks instruction cache activity for determining when an instruction cache has the cache line.

9. The system of claim 6, wherein the cache invalidate request is sent to the instruction cache only when the cache line fetched exclusive by the LSU has been previously fetched by the instruction cache, and has since not been invalidated.

10. The system of claim 6, wherein a delay is added to the return of data for exclusive fetches when the cache invalidate request is sent to the instruction cache.

* * * * *